Patented Apr. 22, 1952

2,594,210

UNITED STATES PATENT OFFICE 2,594,210

RESIN BONDED CORD

Loren D. Potter, Enderlin, N. Dak., and Burt P. Johnson, Charlottesville, Va., assignors to Wingfoot Corporation, Akron, Ohio, a corporation of Delaware No Drawing. Application July 31, 1946, Serial No. 687,515

2 Claims. (Cl. 28—80)

This invention relates to an improved cellulosic cord material for use as a reinforcement in the manufacture of rubber articles, and particularly to an adhesive for improving the tensile strength and fatigue resistance of cotton cord, to a method of producing rubber articles and to the articles so made.

The tensile strength of cotton cord is dependent in part upon the interconnection made between the cotton fibers of the cord. The conventional mechanical method of interconnecting the fibers is by twisting, but the amount of tensile strength that may be developed is limited because twist above a certain amount tends to crush the fibers and thus reduce the tensile strength. A chemical method of developing tensile strength is by means of the use of an adhesive. However, an adhesive having a satisfactory bonding strength often lacks the property of imparting flexibility to the finished cord, an essential requirement of all cord used in the manufacture of rubber tires, belts and other flexible rubber articles. One factor believed to cause rigidity of the finished cord is the tendency for the adhesive to form a coating or jacket around the cord without forming a coating around each individual fiber. Another likely factor is the tendency for the adhesive to impregnate the cord, thereby forming a solid mass substantially completely devoid of flexibility.

The present invention overcomes all of these difficulties by the use of a specific type of resin in admixture with an alkali metal rosinate. The resin is a water-soluble, thermosetting, phenol-formaldehyde condensation product which is prepared by reacting a phenol with a molecular excess of an aldehyde, for example, formaldehyde, in the presence of an alkaline catalyst until a water-soluble product is produced. This resin may be referred to as a phenol-formaldehyde resole or phenol-formaldehyde "A" stage resin.

More particularly, the resin is prepared by reacting 50 parts of phenol with 90 parts of 37% formaldehyde in the presence of 1.5 parts of sodium hydroxide at 90° C. for 50 minutes in a water bath.

Another ingredient that is used in formulating the cord adhesive of this invention is an alkali metal salt of rosin, for example sodium or potassium rosinate. This ingredient may be present in admixture with the resole in an amount between about 25 parts and about 400 parts to 100 parts of the resole. A wetting agent may be used in the formulation of this adhesive and acts to facilitate the application of the adhesive to the fibers. Generally the organic polyether alcohols may be used.

A typical formula comprises 50 parts of resole or "A" stage resin, 25 parts of 1 N sodium hydroxide, 10 parts of Triton NE (an organic polyether alcohol in the form of a clear amber non-ionic liquid) and 915 parts of rosinate solution made up by dissolving 50 parts of sodium rosinate in 950 parts of water. The formation gives a total solids of 5%. The presence of Triton NE acts to increase the wetting power of the solution. The concentration of the resole and the rosinate may be varied but it is preferred to use a concentration of between 1% and 10% total solids. The proportion of resole to rosinate may also be varied as noted but it is prefered that they remain substantially equal. A solubilizing or alkaline agent, for example, sodium hydroxide, may be used in an amount between about 1.5 parts and about 10 parts per 100 parts of resole.

The fibers are treated by the adhesive of this invention in cord form but may also be treated while in the sliver, roving, yarn, or ply form during the regular processes of sliving, roving, plying, cabling and/or stretching. Regardless of the mechanical arrangement of the cotton fibers in the sliver, roving, yarn, ply or cord, this adhesive properly bonds the fibers into flexible relationship to each other to produce a cord admirably adapted for use in tire construction and mechanical rubber goods. The adhesive may be applied to the fibers by dipping or slicking (drawing the fibers over a slowly rotating Scotts roll, the lower portion being submerged in the adhesive), followed by stretching and then heating to thermoset the resin. Different degrees of thermosetting can be achieved by varying the temperature above or below the preferred temperature of 400° F. and by the length of time the fibers are heated. Temperatures between about 300° F. and about 600° F. may be used. The treated cord is heated until the resin has set. The resin is thermoset at about 400° F. using a contact time of about 6 to 15 seconds.

It is not essential, in the production of the improved cord of this invention, to thermoset the resin after it has been applied to the cord, but, rather, the treated cord may be used in the manufatcure of, for example, tires in the usual manner. When the tire is shaped, the treated cord is stretched, and when the tire is vulcanized the resin is thermoset by the heat of vulcanization. This method is very useful since it eliminates the step of thermosetting the resin outside of the rubber article in which the cord is being used. This method also permits a tire to be formed while the cords are still in a condition wherein they may be readily elongated, an essential factor in the rapid production of tires. Greatly increased flex life is realized for tire cord treated and assembled into a tire by this novel method.

The improved adhesive described above was used to treat 16's/4/3 cotton cord, a cord made of raw cotton fiber of 16 hanks per pound, twisted 4 yarns to the ply and 3 plies to the cord. The following data show the improvement made on 16's/4/3 cotton cord dipped in an adhesive comprising 50 parts of phenol-formaldehyde resole, 25 parts of 1 N sodium hydroxide, 10 parts of Triton NE and 915 parts of rosinate made up of 50 parts of sodium rosinate in 950 parts of water. The dipped cord was stretched by applying tension to within 1% of the ultimate elongation and heated by pulling the treated cord through a groove of a circular piece of steel heated at 400° F. The cord was pulled through the groove at a rate to permit heating contact for 25 seconds.

TABLE

| Properties Measured | Standard 16's/4/3 Cotton Tire Cord | Treated 16's/4/3 Cotton Tire Cord | Per Cent Increases |
|---|---|---|---|
| Tensile strength at 70°F., 55 per cent relative humidity. | 20.7 lbs | 27.6 lbs | 33 |
| Unit strength in grams per denier. | 1.97 grams | 2.82 grams | 43 |
| Tensile strength at 250°F | 15.4 lbs | 19.1 lbs | 24 |
| Hot tensile strength in rubber (step load) [1]. | 274,133 cycles | 643,900 cycles | 135 |
| Fatigue life (step load) [2] | 492,400 cycles | 666,667 cycles | 36 |
| Fatigue life (s.ep load) [3] | 492,400 cycles | 876,250 cycles | 78 |
| Olsen tire puncture test [4] | 1677 lbs., 4.82 in. | 1968 lbs., 5.38 in. | 17 |

[1] This test was performed using the apparatus and method described in patent application Serial No. 554,813, filed September 19, 1944, by Mallory, now U. S. Patent 2,412,524, and using a test specimen comprising a tubular piece of rubber having two plies of fabric embedded in the tube and set at an angle to each other (in the angle range used in conventional tire construction) and rotated at a speed which was periodically increased and under a constant internal pressure of 100 pounds per sq. in. while the specimen was held in a position so that the under-surface adjacent the ends of the specimen was disposed at an angle of 90° to each other. The test was started by rotating the specimen at 1000 R. P. M. and increasing the R. P. M. per 15 minute intervals by 250. The test was completed when the specimen failed through rupture of the wall area under test.

[2] This test was performed using the apparatus and general method described in the Mallory application referred to in test No. 1, but using a test specimen comprising a tubular piece of rubber having a single ply of cord disposed longitudinally of and embedded in the rubber, together with a series of cords disposed in the rubber specimen and circumferentially thereof and spaced from the longitudinal cords toward the outer surface of the specimen. This test specimen was then rotated at a constant speed of 1000 R. P. M. while being subjected to a pressure which was periodically increased. The ends of the specimen are held by chucks positioned in such a way that the under-surfaces adjacent the ends were disposed at an angle of 90° to each other. The initial internal pressure was zero and was increased by 5 pounds per sq. in. per 100,000 cycles. The test was completed when the specimen first showed signs of failure of at least one of the longitudinal cords.

[3] This test was performed in the manner described in test No. 2 above, but here the treated cord was thermoset during vulcanization of the test specimen.

[4] This test showed the number of inches a puncturing head had to depress the surface of a rigidly positioned tire before the tire was punctured or pierced by the head, and the force needed to cause this piercing. Thus, in this test more energy had to be used in order to puncture the tire constructed with the improved cotton cord of this invention than had to be used in puncturing a tire constructed of standard cotton cord.

Various methods may be used in thermosetting the adhesive-treated cord in addition to the methods herebefore described. For example, the adhesive composition may be set by the use of infrared radiation, dielectric heating and other well-known methods.

A variation in the method of treating the cord found to be very useful in making cotton tire cords having both high normal and high hot tensile strengths, is to first dip the cord in the adhesive, thermoset the adhesive while the cord is in a relaxed condition and then dip the cord a second time followed by thermosetting the cord under a tension close to actual cord tensile (about 1% below ultimate elongation).

Suitable changes may be made in the details of this invention without departing from the spirit and scope of the invention, the proper limits of which are defined in the appended claims.

We claim:

1. A rubber article reinforced with a cotton cord, the fibers of which cord are bonded together by means of an adhesive comprising a mixture consisting of a phenol-formaldehyde resole resin resulting from the reaction of a phenol and a molecular excess of an aldehyde, and an alkali metal rosinate.

2. A method of manufacturing a cord-reinforced rubber article which comprises embedding in rubber a cotton cord impregnated with an adhesive comprising a mixture consisting of a water-soluble phenol-formaldehyde resole resulting from the action of a phenol and a molecular excess of an aldehyde, and between about 25 parts and about 400 parts of an alkali metal rosinate, subjecting the rubber article to tension and then vulcanizing the assembly sufficiently to at least thermoset the resole.

LOREN D. POTTER.
BURT P. JOHNSON.

REFERENCES CITED

The following references are of record in the file of this patent:

UNITED STATES PATENTS

| Number | Name | Date |
|---|---|---|
| 1,808,716 | Rosenblum | June 2, 1931 |
| 2,128,229 | Charch | Aug. 30, 1938 |
| 2,128,635 | Charch | Aug. 30, 1938 |
| 2,211,948 | Herschberger | Aug. 20, 1940 |
| 2,287,139 | Schneider | June 23, 1942 |
| 2,297,536 | Buckwalter | Sept. 29, 1942 |
| 2,313,104 | Wallach | Mar. 9, 1943 |
| 2,431,977 | Alderfer | Dec. 2, 1947 |
| 2,444,064 | Philipp | June 29, 1948 |